(12) United States Patent
Sivertsen

(10) Patent No.: US 9,342,318 B2
(45) Date of Patent: May 17, 2016

(54) COMMUNICATION DEVICE TO BE USED AS A DIGITAL SIGN AND A METHOD OF CONFIGURING THE COMMUNICATION DEVICE TO BE USED AS A DIGITAL SIGN

(75) Inventor: Clas Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 740 days.

(21) Appl. No.: 13/427,890

(22) Filed: Mar. 23, 2012

(65) Prior Publication Data

US 2013/0252590 A1 Sep. 26, 2013

(51) Int. Cl.
*H04W 24/00* (2009.01)
*G06F 9/44* (2006.01)
*G06F 11/34* (2006.01)

(52) U.S. Cl.
CPC ............ *G06F 9/4428* (2013.01); *G06F 9/4436* (2013.01); *G06F 11/3404* (2013.01); *G06F 11/3419* (2013.01); *G06F 11/3495* (2013.01); *G06F 11/3428* (2013.01); *G06Q 2201/865* (2013.01)

(58) Field of Classification Search
CPC ......... H04W 4/24; H04W 4/02; H04W 12/08; H04W 28/06; H04W 64/00; H04W 88/02; G06Q 30/02; G06Q 30/0267; G06Q 30/0277; G06Q 20/3674; G06Q 30/0251; G06Q 30/0242; G06Q 30/0244; G06Q 30/0248
USPC .................. 455/456.1, 456.3, 411, 26.1, 406, 455/412.2, 433, 450, 456.2, 550.1, 7; 705/14.73, 14.58, 14.64, 14.49, 4.57, 705/14.4, 14.54; 709/203, 206, 224, 14.73, 709/14.58, 14.64, 14.49, 4.57, 14.4, 14.54; 370/259; 380/270
See application file for complete search history.

(56) References Cited

U.S. PATENT DOCUMENTS

| | | | |
|---|---|---|---|
| 2003/0001796 A1* | 1/2003 | Wampler | G06F 3/1438 345/2.1 |
| 2006/0121916 A1* | 6/2006 | Aborn et al. | 455/456.5 |
| 2006/0140353 A1* | 6/2006 | Jung | 379/52 |
| 2006/0253453 A1* | 11/2006 | Chmaytelli et al. | 707/10 |
| 2007/0173895 A1* | 7/2007 | Reichenbach | 607/10 |
| 2008/0059282 A1* | 3/2008 | Vallier et al. | 705/10 |
| 2008/0250464 A1* | 10/2008 | Masucci et al. | 725/82 |
| 2012/0143695 A1* | 6/2012 | Nandagopal | G06Q 30/0269 705/14.66 |
| 2012/0172012 A1* | 7/2012 | Sumcad et al. | 455/414.1 |
| 2013/0106704 A1* | 5/2013 | Vidal et al. | 345/169 |

* cited by examiner

*Primary Examiner* — Fred Casca
(74) *Attorney, Agent, or Firm* — Minh N. Nguyen; Next IP Law Group LLC

(57) ABSTRACT

Technologies are described herein for configuring a communication device to be used as a digital sign. Connection to a remote portal may occur through a transceiver of the communication device. Digital content is received from the remote portal and stored in a memory of the communication device. A digital sign mode of the communication device is activated in response to receiving a first instruction from the remote portal. In the digital sign mode, a ringing function of the communication device may be disabled. A digital content present mode of the communication device is activated in response to receiving a second instruction from the remote portal. In the digital content present mode, the digital content may be presented via at least one of a screen and a speaker of the communication device.

28 Claims, 8 Drawing Sheets

COMMUNICATION DEVICE TO BE USED AS A DIGITAL SIGN AND A METHOD OF CONFIGURING THE COMMUNICATION DEVICE TO BE USED AS A DIGITAL SIGN

BACKGROUND

1. Technical Field

The present invention relates generally to the field of digital signs. More specifically, the disclosure presented herein relates to the field of configuring communication devices to be used as digital signs through control by a remote portal and by other communication devices so configured.

2. Description of the Related Art

Digital signs may be used for a variety of purposes. For example, digital signs may be used to display advertising, provide public information (e.g., news and weather), and provide internal information (e.g., corporate messages). Digital signs are increasingly replacing paper-based signs, such as posters, painted billboards, and light boxes, and other types of conventional signs, such as mechanical flap displays.

Digital signs may be either custom-made or may utilize existing display configurations. Custom-made digital signs are typically used in an outdoor setting and are often manufactured to large specifications designated by an advertiser. Digital signs based on existing display devices are commonly used indoors. Examples of such existing display devices used as digital signs include Liquid Crystal Display (LCD) monitors, plasma displays, Organic Light-Emitting Diode (OLED) monitors, and displays utilizing electronic paper (ePaper) of the type used in eBook Readers.

Custom-made digital signs are expensive and often require a significant waiting time while a manufacturer produces the same to the desired specifications. Digital signs based on existing display devices are also expensive. Moreover, in both cases, many problems are encountered with controlling the digital content displayed thereon. For example, in order to vary the digital content displayed on a conventional outdoor digital sign, it may be necessary for a technician to go to the location of the digital sign with a mass storage device, plug it in, and transfer the updated content. If the amount of data is significant, the data transfer may involve waiting for a long period of time. Moreover, both custom-made digital signs and digital signs based on existing display devices have limited computing capabilities.

SUMMARY

According to one embodiment described herein, a method for configuring a communication device to be used as a digital sign includes connecting to a remote portal, receiving a digital content from the remote portal and storing the same, activating a digital sign mode, and activating a digital content present mode. Connection to the remote portal may occur through a transceiver of the communication device. The digital content received from the remote portal is stored in a memory of the communication device. The digital sign mode of the communication device is activated in response to receiving a first instruction from the remote portal. In the digital sign mode, one or more of the following actions may be taken: disable a ringing function of the communication device, disable a call receive function of the communication device, disable a keyboard input function of the communication device, disable select keys of a keyboard of the communication device, disable a touchscreen function of the communication device, and disable a vibrating alert function of the communication device. The digital content present mode of the communication device is activated in response to receiving a second instruction from the remote portal. In the digital content present mode, the digital content is presented. This may include at least one of displaying video associated with the digital content, outputting sound associated with the digital content, vibrating the communication device, outputting a flash, and outputting data, sounds, etc. requesting interaction from an ad target user(s). According to one implementation, the method further includes obtaining demographic information of persons in the vicinity of the communication device, and transmitting the demographic information to the wireless portal.

According to a further embodiment described herein, a communication device includes a transceiver, a memory, a screen, a speaker, and a processor. The transceiver is configured to connect to a remote portal and receive a digital content from the remote portal. The memory is configured to store the digital content. The processor is configured to activate a digital sign mode of the communication device in response to receiving a first instruction from the remote portal via the transceiver, and to activate a digital content present mode in response to receiving a second instruction from the remote portal via the transceiver.

The above-described embodiments may also be implemented as a computer-controlled apparatus, a computer process, a computing system, an apparatus, as an article of manufacture such as a computer program product or computer-readable medium, or as a semiconductor integrated circuit, including but not limited to a custom application specific integrated circuit, a programmable micro-controller type device, or a field-programmable gate array device. The computer program product may be a computer storage media readable by a computer system and encoding a computer program of instructions for executing a computer process. The computer program product may also be a propagated signal on a carrier readable by a computing system and encoding a computer program of instructions for executing on a computer process.

This Summary is provided to introduce a selection of concepts in a simplified form that are further described below in the Detailed Description. This Summary is not intended to identify key features or essential features of the claimed subject matter. Furthermore, the claimed subject matter is not limited to implementations that solve any or all disadvantages noted in any part of this disclosure.

These and various other features as well as advantages, which characterize the technologies presented herein, will be apparent from a reading of the following Detailed Description and a review of the associated drawings.

DETAILED DESCRIPTION

Figure 1:
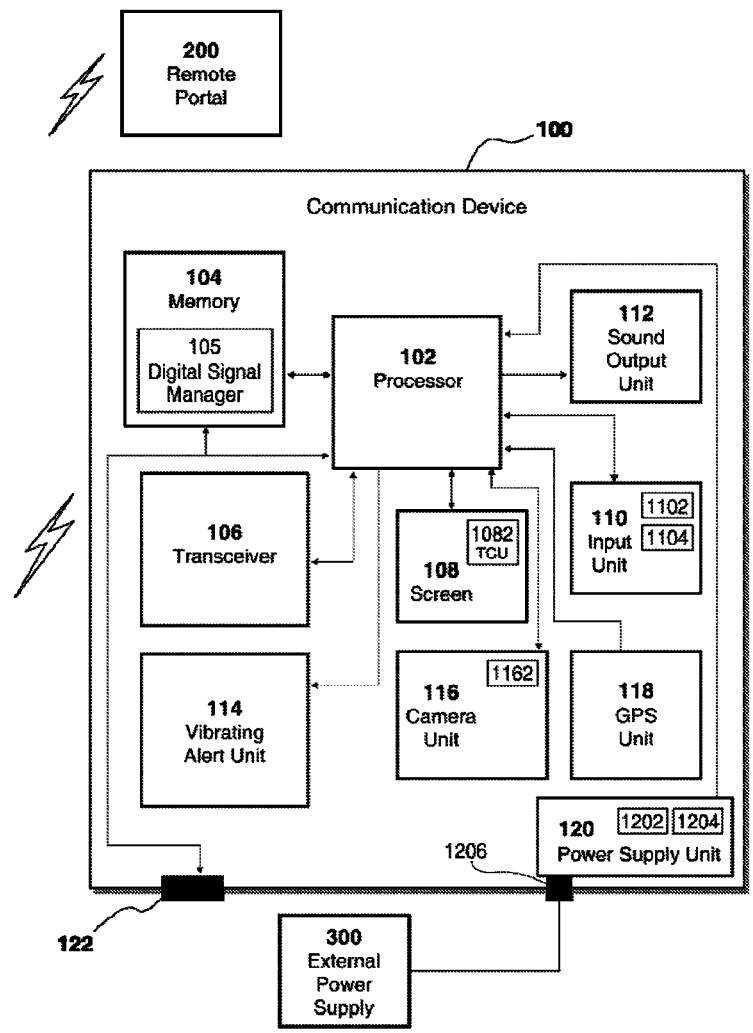
FIG. 1 is a block diagram of a communication device according to an embodiment of the present invention.

Technologies are provided herein for configuring communication devices to be used as digital signs through control by a remote portal. In the following detailed description, references are made to the accompanying drawings that form a part thereof, and in which are shown by way of illustration specific embodiments or examples. Referring now to the drawings, in which like numerals represent like elements through the several figures, aspects of the technologies presented herein will be described.

Referring to FIG. 1, a block diagram will be described that illustrates a communication device according to an embodiment of the present invention.

The communication device 100 comprises a processor 102, a memory 104, a transceiver 106, a screen 108, an input unit 110, a sound output unit 112, a vibrating alert unit 114, a camera unit 116, a Global Positioning System (GPS) unit 118, a power supply unit 120, and a port unit 122. The screen 108 is a touchscreen in some embodiments.

The communication device 100 may correspond to a cellular telephone, a smartphone, a personal digital assistance (PDA), a tablet personal computer (PC), etc. Each of these devices has significant computing power. The advantage of cellular telephones is that they are relatively inexpensive. For example, an advertiser may purchase a large number of cellular telephones from a manufacturer at a relatively low cost, and then configure the cellular telephones to operate as digital signs using embodiments of the invention as will be described below. In this case, it would be possible for the advertiser to make a bulk purchase of an existing model of a cellular telephone, and each cellular telephone may be configured to operate as a digital sign using embodiments of the invention without requiring any type of customization to the hardware specifications of the cellular telephone.

The communication device 100 connects to a remote portal 200 via the transceiver 106. In some embodiments, the transceiver 106 enables the communication device 100 to connect to the remote portal 200 through a mobile device network. Since the different types of mobile device networks are well known in the art, a detailed explanation in this regard will not be provided. In some embodiments, the communication device 100 connects to the remote portal 200 through any one of various common methods of Internet access including but not limited to dial-up, Asymmetric Digital Subscriber Line (ADSL), cable, leased line, satellite, Wi-Fi, Worldwide Interoperability for Microwave Access (WiMAX), Broadband over Power Line (BPL), etc.

The remote portal 200 is operated by a user (hereinafter "remote portal user") to control the communication device 100. As an example, the remote portal user operating and managing the remote portal 200 may be an advertising company which controls the communication device 100 through the remote portal 200. For example, the remote portal 200 may be a website through which the advertising company controls a plurality of the communication devices 100.

The communication device 100 receives a digital content from the remote portal 200 through the transceiver 106. The digital content is then stored in the memory 104 of the communication device 100. The digital content may correspond to one or more advertisements, pieces of information, etc. In some embodiments, the digital content may be updated when additional digital content is sent to the communication device 100 from the remote portal 200. Alternatively, the additional digital content may be stored in the memory 104 of the communication device 100 in addition to the first digital content received from the remote portal 200. In some embodiments, digital content may be pre-stored in the memory 104 of the communication device 100 during manufacture of the communication device 100, and then may be updated or supplemented in the same manner.

The communication device 100 receives a first instruction from the remote portal 200 through the transceiver 106. In response to receiving the first instruction, the processor 102 performs control to activate a digital sign mode of the communication device 100. In the digital sign mode, the processor 102 may do one or more of the following: disable a ringing function of the communication device 100 so that no ringing sound is output through the sound output unit 112 when calls are made to the communication device 100, disable a call receive function of the communication device 100, disable a keyboard input function of the communication device 100 by controlling a keyboard 1102 of the input unit 110, disable select keys of the keyboard 1102 of the input unit 110, disable a touchscreen function of the communication device 100 by controlling a touchscreen control unit 1082 of the screen 108, and disable a vibrating alert function of the communication device 100 by controlling the vibrating alert unit 114 of the communication device 100.

Figure 2:
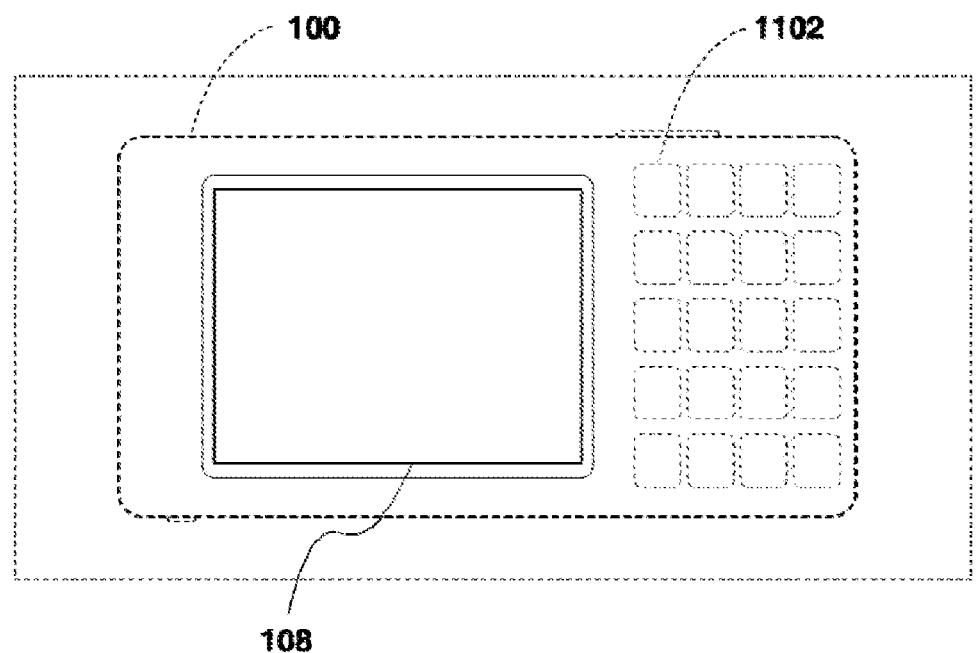
FIG. 2 is a schematic diagram illustrating the communication device in a state mounted in a wall with a keyboard thereof inaccessible in one implementation described herein.

In some embodiments, referring to FIG. 2, the communication device 100 may be mounted such that the keyboard 1102 is not accessible, such as by placing the communication device 100 in a hole in the wall with the keyboard 1102 covered. In such embodiments, it would not be necessary for the processor 102 to disable the keyboard input function of the communication device 100 in the digital sign mode.

The communication device 100 also receives a second instruction from the remote portal 200 through the transceiver 106. In response to receiving the second instruction, the processor 102 performs control to activate a digital content present mode of the communication device 100, in the digital content present mode, the processor 102 presents the digital content. When more than one digital content is stored in the memory 104 or the single digital content corresponds to more than one advertisement or more than one piece of information, presenting the digital content may also involve selecting which digital content, advertisement, or piece of information to present. That is, the second instruction may also include information related to performing such selection.

Presenting digital content may involve displaying video associated with digital content through the screen 108 and/or outputting sound associated with the digital content through the sound output unit 112. In some embodiments, presenting the digital content may additionally or alternatively involve vibrating the communication device 100 through the vibrating alert unit 114 using a predetermined vibrational pattern associated with the digital content. In some embodiments, presenting the digital content may additionally or alternatively involve outputting a flash through a flash mechanism 1162 of the camera unit 116 using a predetermined flash pattern associated with the digital content.

In some embodiments, in the digital content present mode, data is output requesting user input before the digital content is presented. For example, a message such as "Press Here" may be output on the screen 108, and the digital content may be presented in various ways as discussed above after a user (hereinafter "ad target user") presses the screen 108 at the correct location. As another example, a voice message such as "Say 'Play'" may be output via the sound output unit 112, and the digital content may be presented in various ways as discussed above after an ad target user says "play." In this example, the ad target user command of "play" is received via a microphone 1104 of the input unit 110 and is processed by the processor 102 using voice recognition techniques, after which the processor 102 performs control to present the digital content.

When the digital content is an advertisement, obtaining such ad target user interaction significantly enhances the effectiveness of the advertisement. Variations to the examples given above may further enhance the advertising effect. For example, rather than prompting an ad target user to say "play," ad target users may be prompted to say the name of a company or product associated with the advertisement. Voice or text messages to prompt ad target user interaction may also be varied depending on where the communication device 100 is to be placed. For example, a female voice may be used when the communication device 100 is placed in a beauty salon.

In some embodiments, the presence of a person is sensed through the camera unit 116 and further through processing by the processor 102, after which the processor 102 performs control to activate the digital content present mode of the communication device 100 only when the presence of a person is sensed. For example, the communication device 100 may be placed in the area of a coffee machine in a company meeting room or above a urinal in a men's restroom, and the processor 102 activates the digital content present mode only when a person is sensed. As a result, energy utilization is minimized and the advertising effect is enhanced.

In some embodiments, the presence of a person is sensed through the microphone 1104 of the input unit 110 by detecting the voice of the person and by processing by the processor 102 (for example, to distinguish between a human voice and the sound of a passing automobile), after which the processor 102 performs control to activate the digital content present mode of the communication device 100 only when the presence of a person is sensed.

In some embodiments, the presence of a person is sensed through either or both the camera unit 116 and the microphone 1104 of the input unit 110, in cooperation with processing by the processor 102.

In some embodiments, the camera unit 116 and the processor 102 cooperate to detect when an ad target user is looking at the communication device 100, after which the processor 102 performs control to activate the digital content present mode of the communication device 100 only when an ad target user is looking at the communication device 100. This may be performed using eyeball detection and/or eye tracking techniques. In some embodiments, the camera unit 116 and the processor 102 cooperate to perform "eyeball counting," in which the number of times that ad target users look at the communication device 100 is counted, after which the processor 102 performs control to activate the digital content present mode of the communication device 100 only when the number of times that ad target users look at the communication device has a reached a predetermined threshold.

In some embodiments, the processor 102 keeps track of each time a person is sensed (or each time an "eyeball" is counted) during a predetermined time period (e.g., during a 24-hour time period, during 7-9 am, etc.), and transmits this information as demographic information through the transceiver 106 to the remote portal 200. In some embodiments, the processor 102 may be capable of obtaining significantly more detailed demographic information through the camera unit 116 and the microphone 1104 of the input unit 110. For example, using facial recognition techniques, the sex ratio and even ethnic makeup of persons passing by or stopping in front of the communication device 100 may be obtained. As another example, using gesture recognition techniques, emotion recognition from the faces of ad target users is performed to, for example, gauge the reaction of ad target users to presented digital content. As yet another example, how long ad target users viewed a certain advertisement may also be determined using eyeball detection and/or eye tracking techniques mentioned above.

In some embodiments, each or both of the first and second instructions are sent to the communication device 100 by placing a call to the communication device 100 (either by the remote portal 200 or using a wired or wireless device). In such embodiments, the call is made as a voice message or a text message. When the call is made as a voice message, the processor 102 utilizes voice recognition techniques to extract and interpret the commands in the voice message to thereby perform control to activate the digital sign mode and the digital content present mode. When the call is made as a text message, the processor 102 utilizes text analysis techniques to extract and interpret the commands in the received text to thereby perform control to activate the digital sign mode and the digital content present mode. In such embodiments, the processor 102 may also perform control to determine whether the incoming call or incoming text message is from a trusted source to enhance security.

Figure 3:
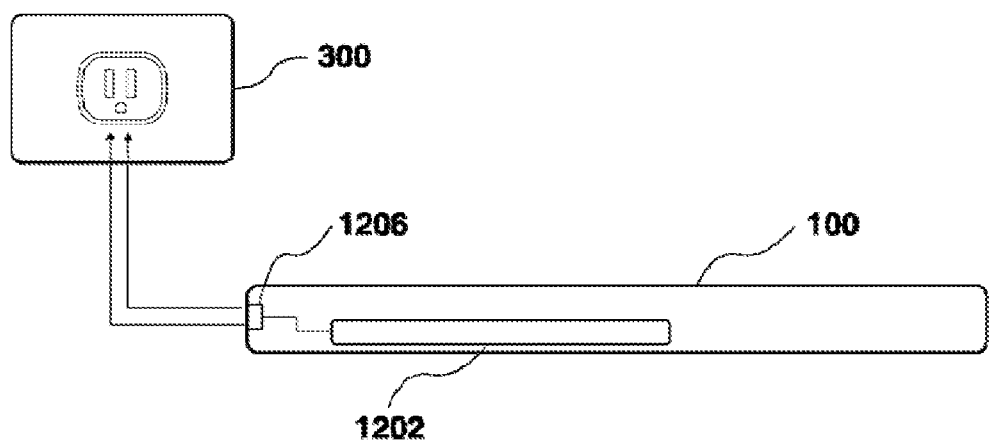
FIG. 3 is a schematic diagram illustrating the communication device in a state connected to an external power supply in one implementation described herein.

In some embodiments, with reference to FIGS. 1 and 3, the power supply unit 120 includes a power port 1206 which is permanently connected to an external power supply 300. In some embodiments, the power supply unit 120 includes a rechargeable battery 1202 which is connected to the wall adapter 1206, charged from the power received from the external power supply 300, and powers all components of the communication device 100. For example, this may be an attractive option when the communication device 100 is mounted in a hole in the wall as shown in FIG. 2. An AC adapter (not shown) may be connected between the power port 1206 and the external power supply 300, or may even be included as part of the power port 1206.

Figure 4:
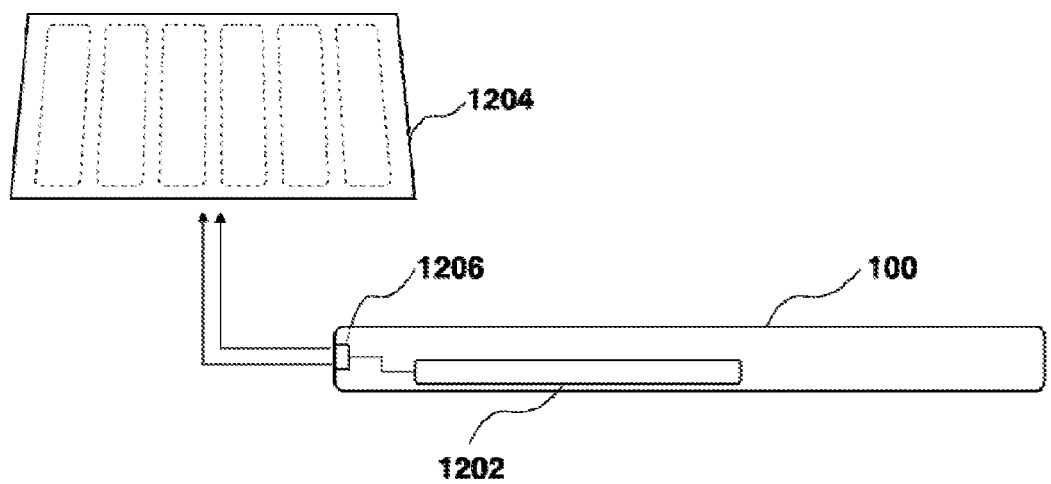
FIG. 4 is a schematic diagram illustrating the communication device including an external photovoltaic cell in one implementation described herein.

In some embodiments, with reference to FIG. 4, the power supply unit 120 includes a photovoltaic cell 1204 connected to the rechargeable battery 1202 and which recharges the rechargeable battery 1202. The photovoltaic cell 1204 may be external to the power supply unit 120 and connected to the rechargeable battery 1202 as shown in FIG. 4, rather than internal to the power supply unit 120 as shown in FIG. 1. The advantage of having an internal photovoltaic cell 1204 is that no additional or customized configuration of the communication device 100 may be required. The advantage of having an external photovoltaic cell 1204 is that the photovoltaic cell 1204 may be placed in a location to optimize exposure to sunlight or another light source.

In embodiments including the photovoltaic cell 1204, the processor 102 performs control to activate the digital content present mode of the communication device 100 only when the rechargeable battery 1202 is sufficiently charged. In some embodiments, the processor 102 selectively disables all the components of the communication device 100 when the rechargeable battery 1202 has a low charge.

In some embodiments, in addition to or instead of the power-saving operations described above, the processor 102 disables all the components of the communication device 100 during certain times of the day, such as at night.

In some embodiments, the processor 102 monitors each of the components of the communication device 100, as well as its own operating condition, and either calls the remote portal 200 and provides an error message to the same whenever an error is detected, or calls the remote portal 200 with a condition message at regular intervals regardless of whether an error is detected. The condition message may inform the remote portal 200 of the overall condition of the communication device 200, namely, whether all components of the communication device 100 are operating normally, and whether an error has been detected and which component of the communication device 100 is malfunctioning if an error has been detected.

In some embodiments, the UPS unit 118 obtains location information and transmits the same to the processor 102. The processor 102 then transmits the location information to the remote portal 200 via the transceiver 106. For example, when the processor 102 transmits the demographic information or the error message to the remote portal 200, the processor 102 may at the same time transmit the location information. This would be advantageous when the remote portal 200 is used to control a large number of communication devices 100.

The port unit 122 may include a Universal Serial Bus (USB) port or other ports for local access and upgrade, expansion ports for additional flash cards, and ports for an external keyboard, monitor, etc. For example, an external monitor (not shown) may be connected to the communication device 200 via the port unit 122 for display of the digital content thereon.

In some embodiments, the communication device 100 runs on the Android Operating System (OS). The Android OS is advantageous in that it is used in many devices, is associated with a large number of application programs ("apps"), and is available under a free license/open source license. However, the communication device 100 is not limited in this respect and other operating systems may be used.

Figure 5:
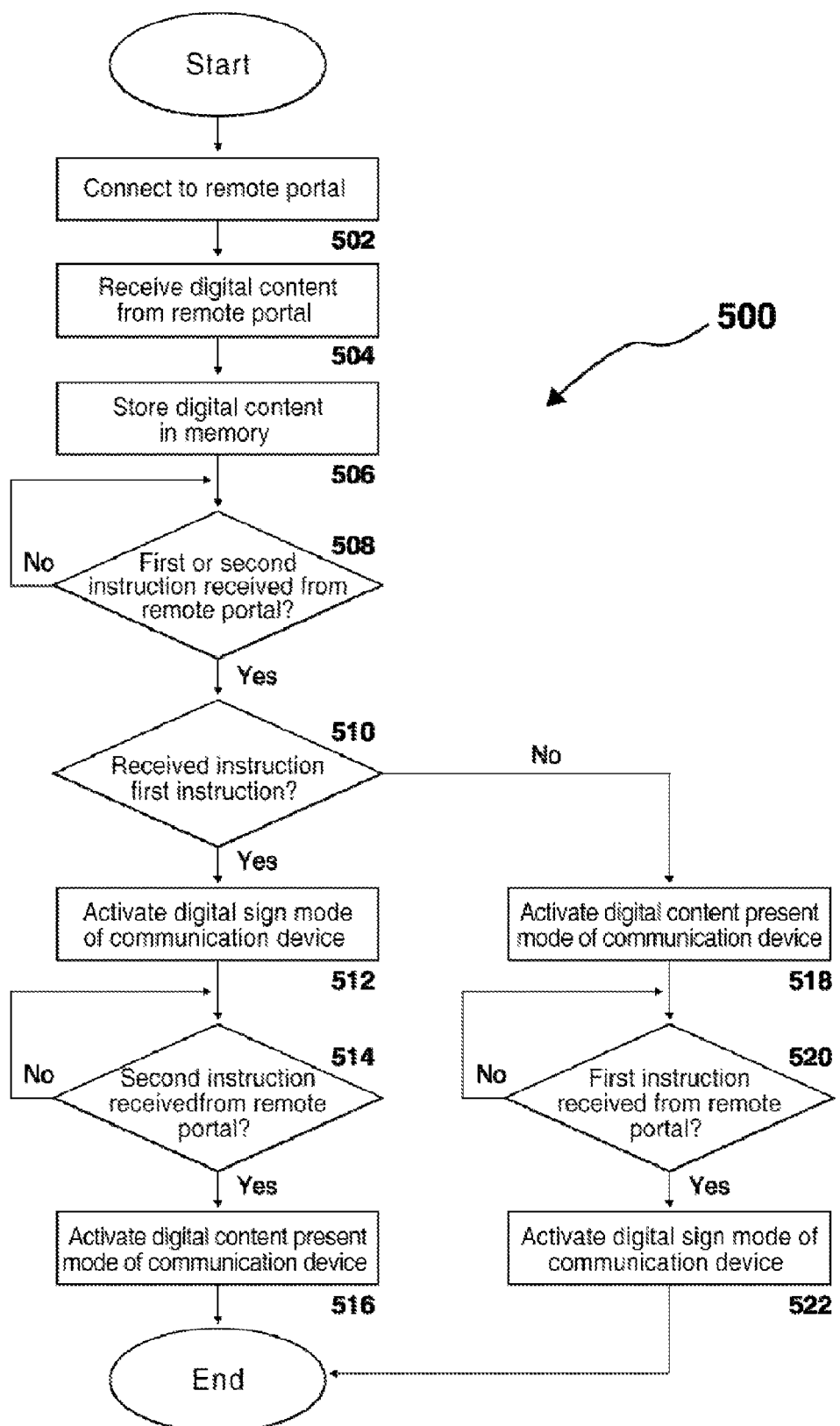
FIG. 5 is a flow diagram illustrating a method for configuring a communication device to be used as a digital sign according to an embodiment of the present invention.

Referring to FIG. 5, a flow diagram will be described that illustrates a method for configuring a communication device to be used as a digital sign according to an embodiment of the present invention.

The routine 500 begins at operation 502, where the communication device 100 connects to the remote portal 200 via the transceiver 106. As described above, in some embodiments, the communication device 100 connects to the remote portal 200 through a mobile device network. In other embodiments, the communication device 100 connects to the remote portal 200 through any one of various methods of Internet access.

From operation 502, the routine 500 continues to operation 504, where a digital content is received from the remote portal 200.

At operation 506, the digital content is stored in the memory 104 of the communication device 100.

From operation 506, the routine 500 continues to operation 508, where a determination is made as to whether the first instruction or the second instruction is received via the transceiver 106 from the remote portal 200. If the first instruction or the second instruction is not received from the remote portal 200, the routine 500 returns back to operation 508. If the first instruction or the second instruction is received from the remote portal 200, the routine continues to operation 510.

At operation 510, a determination is made as to whether the received instruction is the first instruction. If the received instruction is the first instruction, the routine 500 continues to operation 512, where the digital sign mode of the communication device 100 is activated. As described above, in the digital sign mode, the processor 102 may do one or more of the following: disable a ringing function of the communication device 100 so that no ringing sound is output through the sound output unit 112 when calls are made to the communication device 100, disable a call receive function of the communication device 100, disable a keyboard input function of the communication device 100 by controlling a keyboard 1102 of the input unit 110, disable select keys of the keyboard 1102 of the input unit 110, disable a touchscreen function of the communication device 100 by controlling a touchscreen control unit 1082 of the screen 108, and disable a vibrating alert function of the communication device 100 by controlling the vibrating alert unit 114 of the communication device 100.

From operation 512, the routine 500 continues to operation 514, where a determination is made as to whether the second instruction is received via the transceiver 106 from the remote portal 200. If the second instruction is not received from the remote portal 200, the routine 500 returns back to operation 514. If the second instruction is received from the remote portal 200, the routine continues to operation 516.

At operation 516, the digital content present mode of the communication device 100 is activated. In the digital content present mode, the processor 102 presents the digital content. As described above, presenting the digital content may involve any one or more of displaying video associated with the digital content through the screen, outputting sound associated with the digital content through the sound output unit 112, vibrating the communication device 100 through the vibrating alert unit 114, outputting a flash through the flash mechanism 1162 of the camera unit 116, and outputting data, sounds, etc. requesting interaction from the ad target user.

If, at operation 510, the received instruction is not the first instruction, which means that the received instruction is the second instruction, the routine 500 branches to operation 518, where the digital content present mode of the communication device 100 is activated.

From operation 518, the routine 500 continues to operation 520, where a determination is made as to whether the first instruction is received via the transceiver 106 from the remote portal 200. If the first instruction is not received from the remote portal 200, the routine 500 returns back to operation 520. If the first instruction is received from the remote portal 200, the routine continues to operation 522.

At operation 522, the digital sign mode of the communication device 100 is activated.

Various different connection configurations that may be used when there are a plurality of communication devices 100 will now be discussed with reference to FIGS. 6 to 9.

Figure 6:
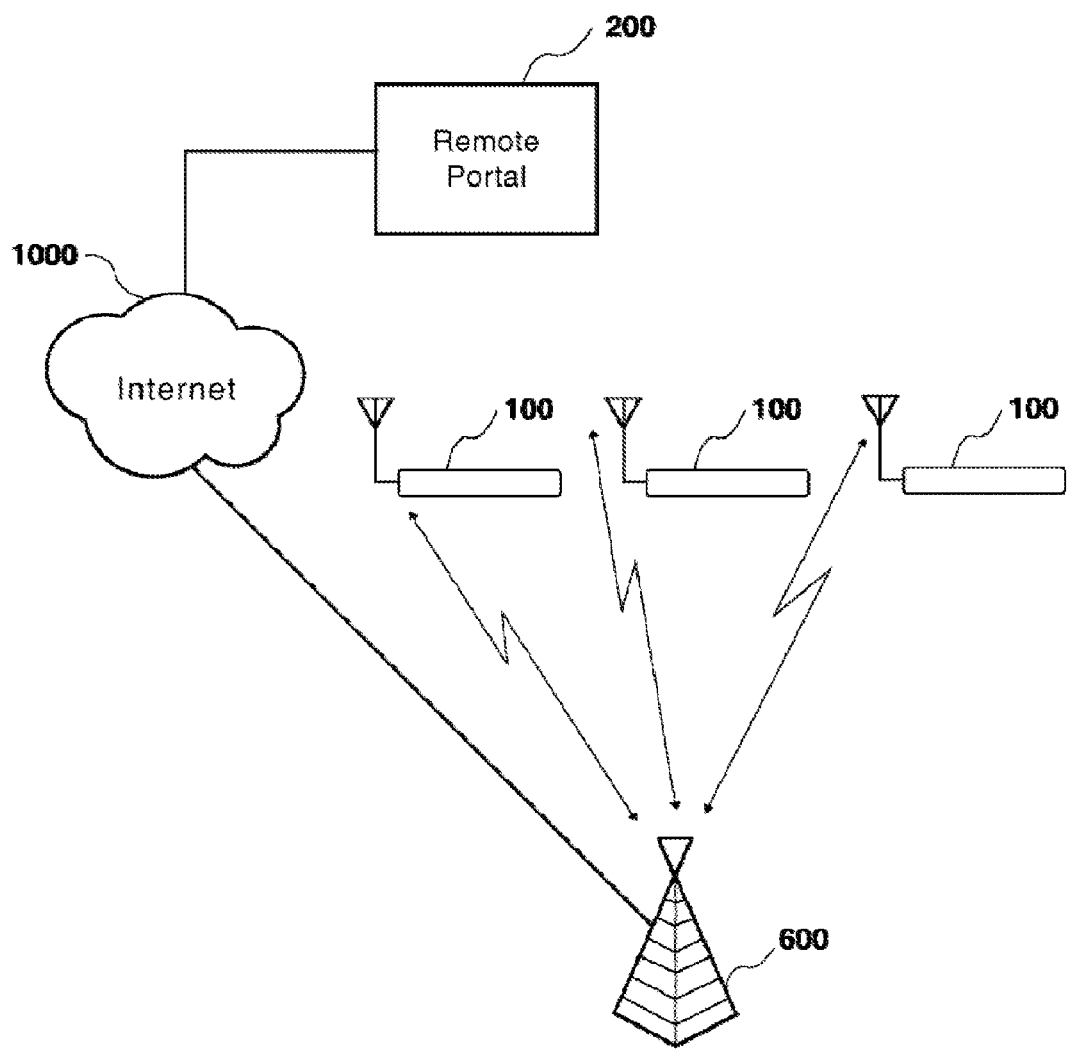
FIGS. 6 to 9 are schematic diagrams of various connection configurations that may be employed when a plurality of communication devices are configured to be used as digital signs in implementations described herein.

In some embodiments, with reference to FIG. 6, each of the communication devices 100 wirelessly connects to a base station 600 via a radio service, and the base station 600 is connected to the remote portal 200 via the Internet 1000. With such a configuration, each of the communication devices 100 has a subscription, which in this example is to the radio service.

Figure 7:
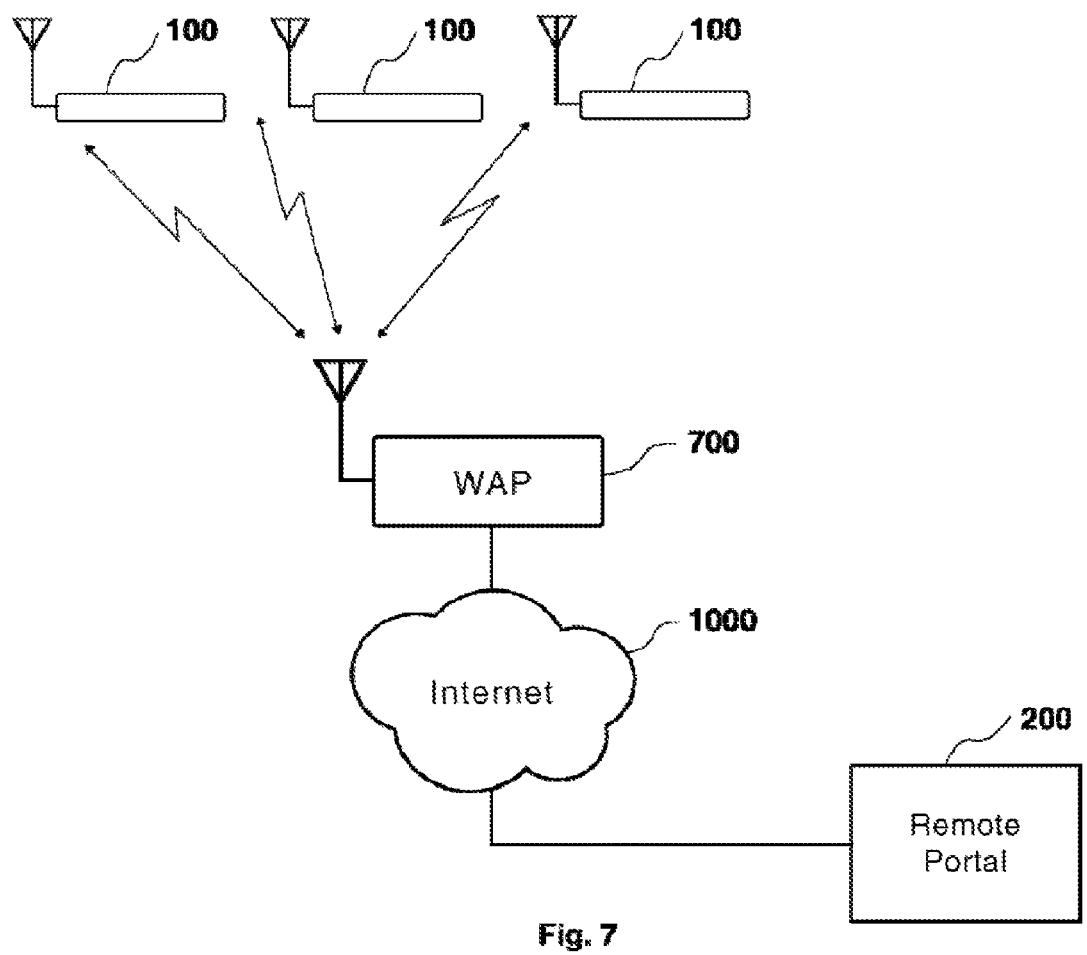

In some embodiments, with reference to FIG. 7, each of the communication devices 100 wirelessly connects to a Wireless Access Point (WAP) 700 through Wi-Fi®, Bluetooth®, or related standards. The WAP 700 may be connected to the Internet 1000 using a broadband modem to thereby enable connection to the remote portal 200 through the Internet 1000. In this case, only the WAP 700 has a subscription, which in this example is to an Internet service.

Figure 8:
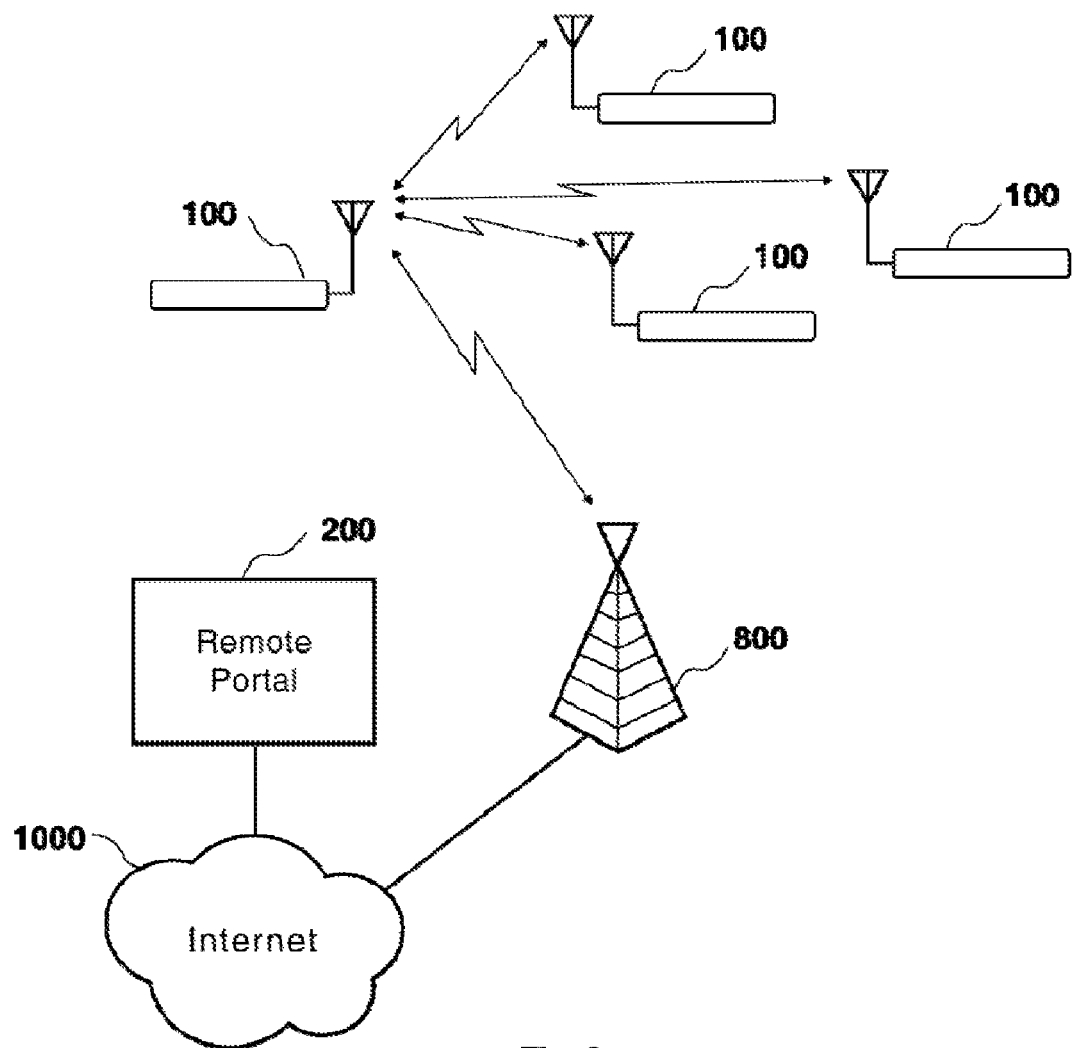

In some embodiments, with reference to FIG. 8, only one of the communication devices 100 is wirelessly connected to a base station 800 via a radio service, and the base station 800 is connected to the remote portal 200 via the Internet 1000. The communication device 100 wirelessly connected to the base 800 then functions as a hub for the remainder of the communication devices 100, which are connected to the hub communication device 100 through a wireless connectivity technology such as Wi-Fi. The hub communication device 100 may relay the digital content, the first instruction, and the second instruction received from the remote portal 200 to the other communication devices 100, and may similarly relay data received from the other communication devices (for example, demographic information) to the remote portal 200. In some embodiments, when the presenting of digital content involves only display of the digital content, the other communication devices 100 may be clones of the hub communication device 100 and thereby display the same digital content as that displayed by the hub communication device 100. In this case, only the hub communication device 100 has a subscription, which in this example is to a radio service.

Figure 9:
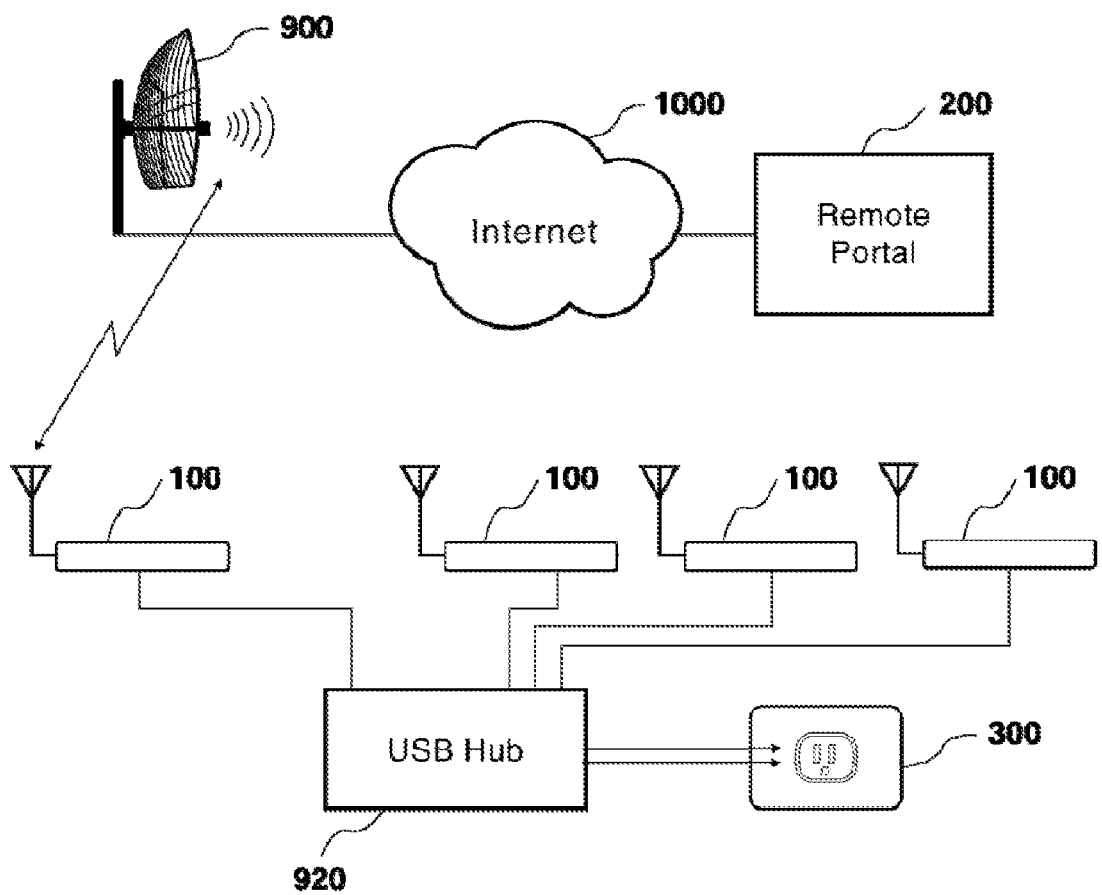

In some embodiments, with reference to FIG. 9, only one of the communication devices 100 is wirelessly connected to a Wi-Fi access point 900, and the Wi-Fi access point 900 is connected to the remote portal 200 via the Internet 1000. The communication device 100 wirelessly connected to the Wi-Fi access point 900 is connected to a USB hub 920, and the USB hub 920 is connected to a wall socket to receive AC power therefrom. A plurality of communication devices 100 are connected to the USB hub 920 and receive power from the USB hub 920. The communication device 100 connected to the Wi-Fi access point 900 functions as a USB host by relaying the digital content, the first instruction, and the second instruction received from the remote portal 200 to the other communication devices 100 via the USB hub 920, and may similarly relay data received from the other communication devices (for example, demographic information) to the remote portal 200. In some embodiments, when the presenting of digital content involves only display of the digital content, the other communication devices 100 may be clones of the USB host communication device 100 and thereby display the same digital content as that displayed by the USB host communication device 100. In this case, only the USB host communication device 100 has a subscription, which in this example is to a Wi-Fi service.

Aspects of these examples may be interchanged in a variety of ways. For example, the hub communication device 100 of FIG. 8 may be connected to a access point, rather than to the base station 800.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for configuring a communication device to be used as a digital sign, comprising:
    connecting a communication device to a remote portal via a transceiver of a the communication device;
    receiving a digital content, a first instruction, and a second instruction from the remote portal;
    storing the digital content in memory of the communication device; activating by a processor a digital sign mode on the communication device based on the received first instruction from the remote portal by disabling a ringing function of the communication device; and
    activating a digital content present mode on the communication device based on the received second instruction from the remote portal by presenting the digital content via at least one of a screen of the communication device and a speaker of the communication device, wherein activating the digital sign present mode of the communication device is further achieved by displaying a message on the screen of the communication device requesting an ad target user to contact the screen, wherein the digital content is presented after the ad target user contacts the screen, wherein the above steps are performed automatically without human.

2. The method of claim 1, wherein activating the digital sign mode of the communication device is further achieved by disabling a call receive function of the communication device.

3. The method of claim 1, wherein activating the digital sign mode of the communication device is further achieved by disabling a keyboard input function of the communication device.

4. The method of claim 1, wherein activating the digital sign present mode of the communication device is further achieved by vibrating the communication device using a predetermined vibrational pattern associated with the digital content.

5. The method of claim 1, further comprising:
    obtaining demographic information of persons in the vicinity of the communication device through cooperation between a processor and at least one of a camera unit and a microphone of the communication device; and
    transmitting the demographic information to the remote portal via the transceiver.

6. A method for configuring a communication device to be used as a digital sign, comprising:
    connecting a communication device to a remote portal via a transceiver of the communication device;
    receiving a digital content, a first instruction, and a second instruction from the remote portal;
    storing the digital content in memory of the communication device;
    activating a digital sign mode on the communication device based on the received first instruction from the remote portal by disabling a ringing function of the communication device; and
    activating by a processor a digital content present mode on the communication device based on the received second instruction from the remote portal by presenting the digital content via at least one of a screen of the communication device and a speaker of the communication device,
    wherein activating the digital sign present mode of the communication device is further achieved in response to receiving the second instruction from the remote portal and detecting the presence of a person in the vicinity of the communication device through cooperation between a processor and at least one of a camera unit and a microphone of the communication device wherein the above steps are performed automatically without human.

7. The method of claim 6, wherein activating the digital sign mode of the communication device is further achieved by disabling a call receive function of the communication device.

8. The method of claim 6, wherein activating the digital sign mode of the communication device is further achieved by disabling a keyboard input function of the communication device.

9. The method of claim 6, further comprising:
    obtaining demographic information of persons in the vicinity of the communication device through cooperation between a processor and at least one of a camera unit and a microphone of the communication device; and
    transmitting the demographic information to the remote portal via the transceiver.

10. The method of claim 6, wherein activating the digital sign present mode of the communication device is further achieved by vibrating the communication device using a predetermined vibrational pattern associated with the digital content.

11. A communication device configured to be used as a digital sign, comprising:
   a transceiver configured to connect to a remote portal and receive a digital content, a first instruction, and a second instruction from the remote portal; a processing device; and
   memory including a digital sign manager which has instructions that are executed by the processing device, the instructions including the following logics:
   activating a digital sign mode on the communication device in response to receiving the first instruction from the remote portal via the transceiver by disabling a ringing function of the communication device;
   receiving a second instruction from the remote portal via the transceiver; and
   activating a digital content present mode based on the received second instruction from the remote portal via the transceiver, wherein in the digital content present mode, the processor presents the digital content via at least one of a screen and a speaker of the communication device, wherein the screen of the communication device comprises a touchscreen including a touchscreen control unit, wherein in the digital content present mode, the processor further outputs a message on the screen requesting an ad target user to contact the screen, wherein the digital content is presented after the ad target user contacts the screen, wherein the above logics are performed automatically without human.

12. The communication device of claim 11, wherein in the digital sign mode, the processor further disables a call receive function of the communication device.

13. The communication device of claim 11, further comprising a keyboard, wherein in the digital sign mode, the processor further disables the keyboard.

14. The communication device of claim 11, further comprising a vibrating alert unit, wherein in the digital content present mode, the processor further vibrates the communication device by controlling the vibrating alert unit using a predetermined vibrational pattern associated with the digital content.

15. The communication device of claim 11, further comprising a camera unit and a microphone, wherein the processor is further configured to:
   obtain demographic information of persons in the vicinity of the communication device through cooperation with least one of the camera unit and the microphone; and
   transmit the demographic information to the wireless portal via the transceiver.

16. A communication device configured to be used as a digital sign, comprising:
   a transceiver configured to connect to a remote portal and receive a digital content, a first instruction, and a second instruction from the remote portal; a processing device;
   memory including a digital sign manager which has instructions that are executed by the processing device, the instructions including the following logics:
   activating a digital sign mode on the communication device in response to receiving the first instruction from the remote portal via the transceiver by disabling a ringing function of the communication device;
   receiving a second instruction from the remote portal via the transceiver; and activating a digital content present mode based on the received second instruction from the remote portal via the transceiver, wherein in the digital content present mode, the processor presents the digital content via at least one of a screen and a speaker of the communication device, wherein the above logics are performed automatically without human; and
   a camera unit and a microphone, wherein the processor activates the digital content present mode in response to receiving the second instruction from the remote portal and in response to detecting the presence of a person in the vicinity of the communication device, the processor detecting the presence of a person in the vicinity of the communication device through cooperation with at least one of the camera unit and the microphone.

17. The communication device of claim 16, wherein in the digital sign mode, the processor further disables a call receive function of the communication device.

18. The communication device of claim 16, further comprising a keyboard, wherein in the digital sign mode, the processor further disables the keyboard.

19. The communication device of claim 16, further comprising a vibrating alert unit, wherein in the digital content present mode, the processor further vibrates the communication device by controlling the vibrating alert unit using a predetermined vibrational pattern associated with the digital content.

20. The communication device of claim 16, further comprising a camera unit and a microphone, wherein the processor is further configured to:
   obtain demographic information of persons in the vicinity of the communication device through cooperation with least one of the camera unit and the microphone; and
   transmit the demographic information to the wireless portal via the transceiver.

21. A non-transitory computer-readable storage medium storing instructions that when executed by a computer cause the computer to perform a method for configuring a communication device to be used as a digital sign, the method comprising:
   connecting a communication device to a remote portal via a transceiver of the communication device;
   receiving a digital content from the remote portal; storing the digital content in a memory of the communication device; activating a digital sign mode on the communication device based on the received first instruction from the remote portal, wherein in the digital sign mode, a ringing function of the communication device is disabled; and
   activating a digital content present mode on the communication device based on the received second instruction from the remote portal, wherein in the digital content present mode, the digital content is presented via at least one of a screen of the communication device and a speaker of the communication device, wherein in the digital content present mode, a message is further output on the screen of the communication device requesting an ad target user to contact the screen, wherein the digital content is presented after the ad target user contacts the screen, wherein the above steps are performed automatically without human intervention, wherein the above steps are performed automatically without human.

22. The non-transitory computer-readable storage medium of claim 21, wherein in the digital sign mode, a call receive function of the communication device is further disabled.

23. The non-transitory computer-readable storage medium of claim 21, wherein in the digital sign mode, a keyboard input function of the communication device is further disabled.

24. The non-transitory computer-readable storage medium of claim 21, wherein the method further comprises:
obtaining demographic information of persons in the vicinity of the communication device through cooperation with at least one of a camera unit and a microphone of the communication device; and
transmitting the demographic information to the wireless portal via the transceiver.

25. A non-transitory computer-readable storage medium storing instructions that when executed by a computer cause the computer to perform a method for configuring a communication device to be used as a digital sign, the method comprising:
connecting a communication device to a remote portal via a transceiver of the communication device;
receiving a digital content from the remote portal; storing the digital content in a memory of the communication device; activating a digital sign mode on the communication device based on the received first instruction from the remote portal, wherein in the digital sign mode, a ringing function of the communication device is disabled; and
activating a digital content present mode on the communication device based on the received instruction from the remote portal, wherein in the digital content present mode, the digital content is presented via at least one of a screen of the communication device and a speaker of the communication device, wherein the digital content present mode is activated in response to receiving the second instruction from the remote portal and in response to detecting the presence of a person in the vicinity of the communication device through cooperation with least one of a camera unit and a microphone of the communication device, wherein the above steps are performed automatically without human.

26. The non-transitory computer-readable storage medium of claim 25, wherein in the digital sign mode, a call receive function of the communication device is further disabled.

27. The non-transitory computer-readable storage medium of claim 25, wherein in the digital sign mode, a keyboard input function of the communication device is further disabled.

28. The non-transitory computer-readable storage medium of claim 25, wherein the method further comprises:
obtaining demographic information of persons in the vicinity of the communication device through cooperation with at least one of a camera unit and a microphone of the communication device; and
transmitting the demographic information to the wireless portal via the transceiver.

* * * * *